US009154457B1

(12) United States Patent
Li et al.

(10) Patent No.: US 9,154,457 B1
(45) Date of Patent: Oct. 6, 2015

(54) INBAND MANAGEMENT IN A MULTI-STAGE CLOS NETWORK

(75) Inventors: Jiangbo Li, San Jose, CA (US); Junlan Zhou, Sunnyvale, CA (US); Joon Ong, Cupertino, CA (US)

(73) Assignee: Google Inc., Mountain View, CA (US)

( * ) Notice: Subject to any disclaimer, the term of this patent is extended or adjusted under 35 U.S.C. 154(b) by 306 days.

(21) Appl. No.: 13/535,557

(22) Filed: Jun. 28, 2012

(51) Int. Cl.
*H04L 29/12* (2006.01)

(52) U.S. Cl.
CPC ...... *H04L 61/2528* (2013.01); *H04L 29/12339* (2013.01); *H04L 61/103* (2013.01); *H04L 61/2503* (2013.01); *H04L 61/6068* (2013.01)

(58) Field of Classification Search
CPC ............. H04L 61/2596; H04L 61/103; H04L 61/6022; H04L 29/12028; H04L 29/12584; H04L 61/2528
USPC ......................................................... 370/392
See application file for complete search history.

(56) References Cited

U.S. PATENT DOCUMENTS

| 7,760,735 | B1  |   | 7/2010 | Chen et al. |
|---|---|---|---|---|
| 8,503,305 | B2 | * | 8/2013 | Porat et al. .................... 370/236 |
| 2005/0147097 | A1 | * | 7/2005 | Chari et al. ................... 370/392 |
| 2007/0192495 | A1 | * | 8/2007 | Marais .......................... 709/227 |
| 2012/0014387 | A1 | * | 1/2012 | Dunbar et al. ............ 370/395.53 |
| 2012/0151085 | A1 | * | 6/2012 | Singh et al. ................... 709/232 |

* cited by examiner

*Primary Examiner* — Omer S Mian
(74) *Attorney, Agent, or Firm* — Edward A. Gordon; Foley & Lardner LLP (57) ABSTRACT

Systems and methods for managing a large number of multi-stage switches in a data center are provided. In one aspect, a plurality of first stage switches in a switch cluster may be configured to function as a proxy switch for a given number of second stage switches in the switch cluster. Each of the first stage switches may thus receive, via a first set of networking links, inbound control plane management traffic destined for respective ones of the given number of second stage switches. The first stage switches may then route the control plane management traffic to the appropriate second stage switches via a second set of bidirectional links. In addition, each of the second stage switches may be further configured to route outbound data traffic originating from the second stage switches using all available uplinks in the second set of bidirectional links.

18 Claims, 8 Drawing Sheets

INBAND MANAGEMENT IN A MULTI-STAGE CLOS NETWORK

BACKGROUND OF THE INVENTION

In a data center, a network of servers forming a Control Plane Network ("CPN network") provide services for deploying and managing a set of clustered switches that may be interconnected with a number of host machines such as web and database servers. In order to provide such management services, one or more of the CPN management components (such as a central CPN manager or controller, a CPN installer, and a CPN link installer) may be interconnected to an Out-Of-Band ("OOB") management interface provided on each of a large plurality of Top of the Rack ("ToR") switches via uplink and downlink ports of one or more CPN edge switches. While such configuration provides connectivity between the ToR switches and the CPN, a large scale data center that includes hundreds or thousands of ToR switches can be expensive and difficult to implement and manage, as it typically requires each of the ToR switches to be physically and directly interconnected to one or more CPN edge switches.

SUMMARY OF THE INVENTION

The present disclosure is generally directed to data centers including a large number of interconnected switches, host machines, and management servers. More specifically, aspects of this disclosure are directed to efficient and reliable management of a large number of switches in a data center switch cluster via management servers forming a CPN network, where the clustered switches are interconnected in the data center in the form of Equal Cost Multiple Path ("ECMP") Clos architecture.

As discussed herein, systems and methods for managing a large number of ToR switches via a CPN network are provided, in which a relatively few number of ToR switches may physically interconnected to one or more CPN edge switches, while the remaining majority of ToR cluster switches are managed in-band.

In one aspect, a method for in-band management of a plurality of switches in a data center is provided. The method may include assigning each of a plurality of first stage switches in a switch cluster as a respective proxy switch for a given number of second stage switches in the switch cluster, where each of the given number of second stage switches are directly interconnected to each of the plurality of first stage switches via a first set of bidirectional networking links. The method may further include receiving, at a given first stage switch in the plurality of first stage switches in the switch cluster, a request from an edge switch directly interconnected with the given first stage switch via a second set of bidirectional networking links (that are different from the first set of bi-directional links), and, providing a response from the given first stage switch to the edge switch, where the response is configured to inform edge switch that the given first stage switch and the given number of second stage switches proxied by the given first stage switch are each directly interconnected with the edge switch via the second set of bidirectional networking links.

In another aspect, a system for in-band management of a data center having a switch cluster including a plurality of switches is provided. The system may include a plurality of first stage switches in the switch cluster assigned as a respective proxy switch for a given number of second stage switches in the switch cluster, where each of the given number of second stage switches being directly interconnected to each of the plurality of first stage switches via a first set of bi-directional networking links. The system may further include an edge switch that is directly interconnected to each of the given number of first stage switches via a second set of bi-directional links that different from the first set of bidirectional links. A given first stage switch in the plurality of first stage switches in the switch cluster may be configured to receive a request from an edge switch via the second set of bidirectional networking links. Upon receiving the request, the given first stage switch may be further configured transmit a response from the given first stage switch to the edge switch via the second set of bidirectional networking links, where the response may be configured to inform the edge switch that the given first stage switch that received the request and each of the given number of second stage switches proxied by the given first stage switch (that did not receive the request and are not physically interconnected to the edge switch via the second set of bidirectional links) are each directly interconnected with the edge switch via the second set of bidirectional networking links.

DETAILED DESCRIPTION

Figure 1:
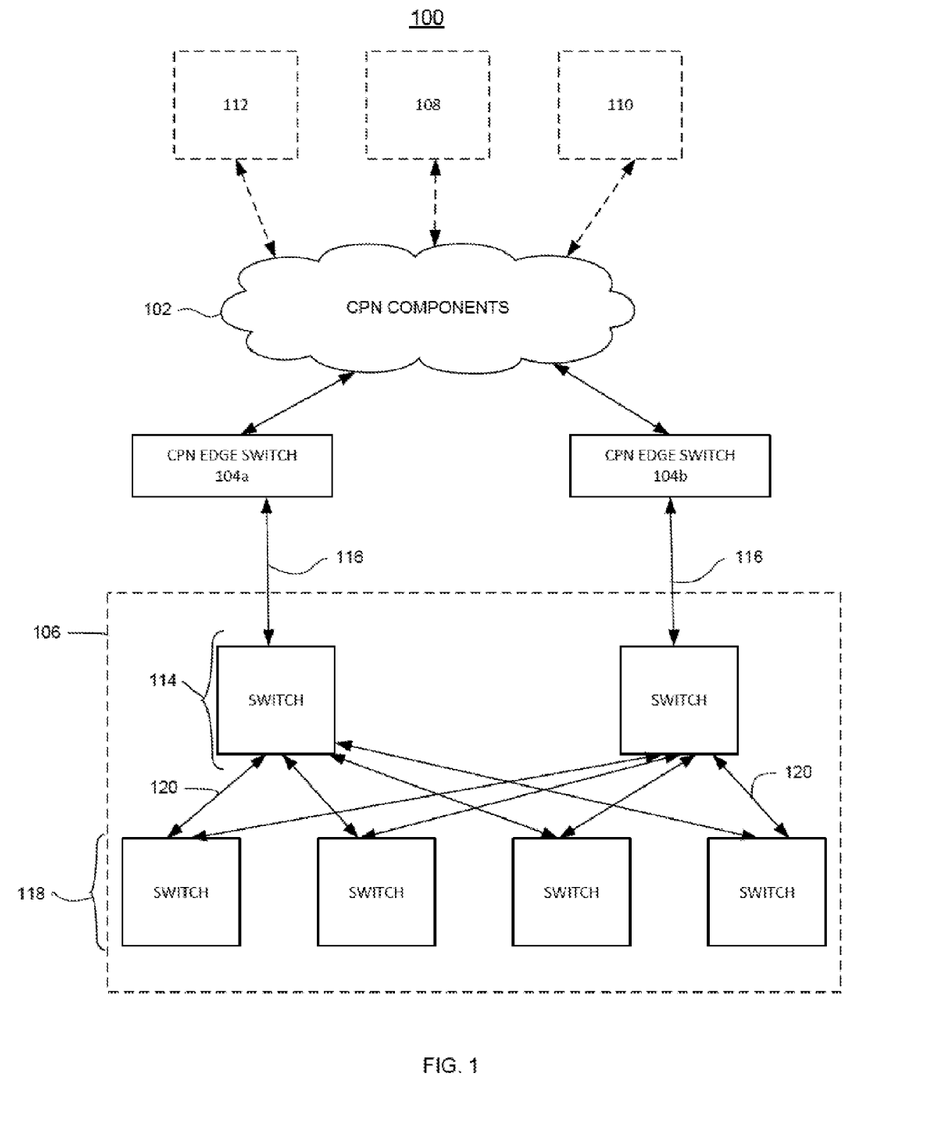
FIG. 1 depicts a simplified architecture for in-band management of a two-stage CLOS switch cluster in a data center.

FIG. 1 illustrates a simplified functional diagram of a networked data center 100 in accordance with various aspects of the disclosure. Data center 100 may include a network of CPN management components 102 for managing a large number interconnected ToR switches in the data center. The CPN management components 102 may be networked via one more edge switches 104a, 104b, with a managed switch cluster 106. The switch cluster 106 may include a number of ToR switches that are managed in-band by the CPN management components 102 as described below. The CPN management components 102 may include, for example, a CPN manager 108 for configuring and centrally managing the operation of the switch cluster 106, a CPN installer 110 for installing one or more switches in the switch cluster 106, and other CPN management components 112, such as a CPN link installer for maintaining and managing the networking links interconnecting the switch cluster 106 in the data center 100.

Each of the CPN management components 102 may be implemented in a separate computing device or server that is interconnected to the other servers. Alternatively, more than one CPN management component may be implemented in a single computing device or server, which in turn may be interconnected with another server or servers that include other management components of the CPN network. The functionality of the CPN management components, the CPN edge switches, and each of the switches in the switch cluster, may be implemented in software, hardware, or a combination of both.

While only a few switches are depicted to aid understanding, in a typical implementation the data center may include a large number (e.g., hundreds or thousands) of switches that may be managed in-band in accordance with various aspects of the present disclosure. In addition, the data center 100 may also include any number of other ToR switches or switch clusters (not shown) that may be conventionally managed by the CPN management components 102 via an OOB management interface, which may interconnect such other switches to one or more CPN edge switches in the data center. A data center 100 may also include a number of host machines (not shown) that are configured as web servers, application servers, data base servers, etc. The host machines within the data center 100 may be accessible to users via an interconnected external network such as the Internet. The host machines may receive, transmit, and process data (e.g., web queries/responses) to/from external user devices and other host machines via the via the data center.

Each of the in-band managed switches in the switch cluster 106 may include a layered network protocol stack (e.g., an OSI networking protocol stack) for enabling network communications with other devices within the data center in accordance with one or more networking protocols implemented by the network protocol stack. The networking protocols may be implemented in hardware, software, or a combination thereof, and may define particular protocols such as the data link layer ("layer 2") protocol, the network layer ("layer 3") protocol, and other protocols specified by the layers in the OSI protocol stack. Similarly, the CPN edge switches 104*a*, 104*b*, the CPN components 102, and other devices in the data center 100 such as the host machines, may also implement a layered network protocol stack for enabling network communications between various networking devices in the data center.

In one aspect, the switches in the switch cluster 106 may be centrally configured (e.g., by the CPN manager 108) to communicate with one or more CPN components 102 (via the CPN edge switches 104*a*, 104*b*) and one or more switches in the switch cluster using one or more layers of the network protocol stack. In another aspect, the switches in the switch cluster 106 may be configured by implementing all or a portion of the functionality of the CPN manager locally within the switches (e.g., via software installed locally on the switches), and the switches may then cooperatively communicate with each other with respect to the management and operation of the switch cluster.

In one embodiment, the switches in the managed switch cluster 106 may be functionally organized into multiple stages within the switch cluster. As shown in FIG. 1, for example, the switch cluster 106 may include a number of first stage switches 114 ("stage 1 switches") that are directly interconnected with a given CPN edge switch 104*a*, 104*b* via a bi-directional networking links 116. In this regard, the term bidirectional networking links may be generally understood to include both networking uplinks and downlinks that are appropriately coupled to proper inbound and outbound ports of the switches to enable bidirectional network communication between a switch and another device.

As further illustrated in FIG. 1, each of a remaining number of second stage switches 118 ("stage 2 switches") may also be interconnected with each of the stage switches via bi-directional networking links 120, for example, in the form of a Clos architecture. In one aspect, the stage 2 switches may be ToR switches that are managed in-band by the CPN components 102 as described below. While only stage 1 and stage 2 switches are illustrated for ease of understanding, the disclosure is not so limited. In other aspects, the switch cluster 106 may include additional stages having one or more switches, where each switch in an additional stage may be a ToR switch directly interconnected via one or more bi-directional networking links to each switch of a previous stage in the form of a Clos architecture.

Figure 2:
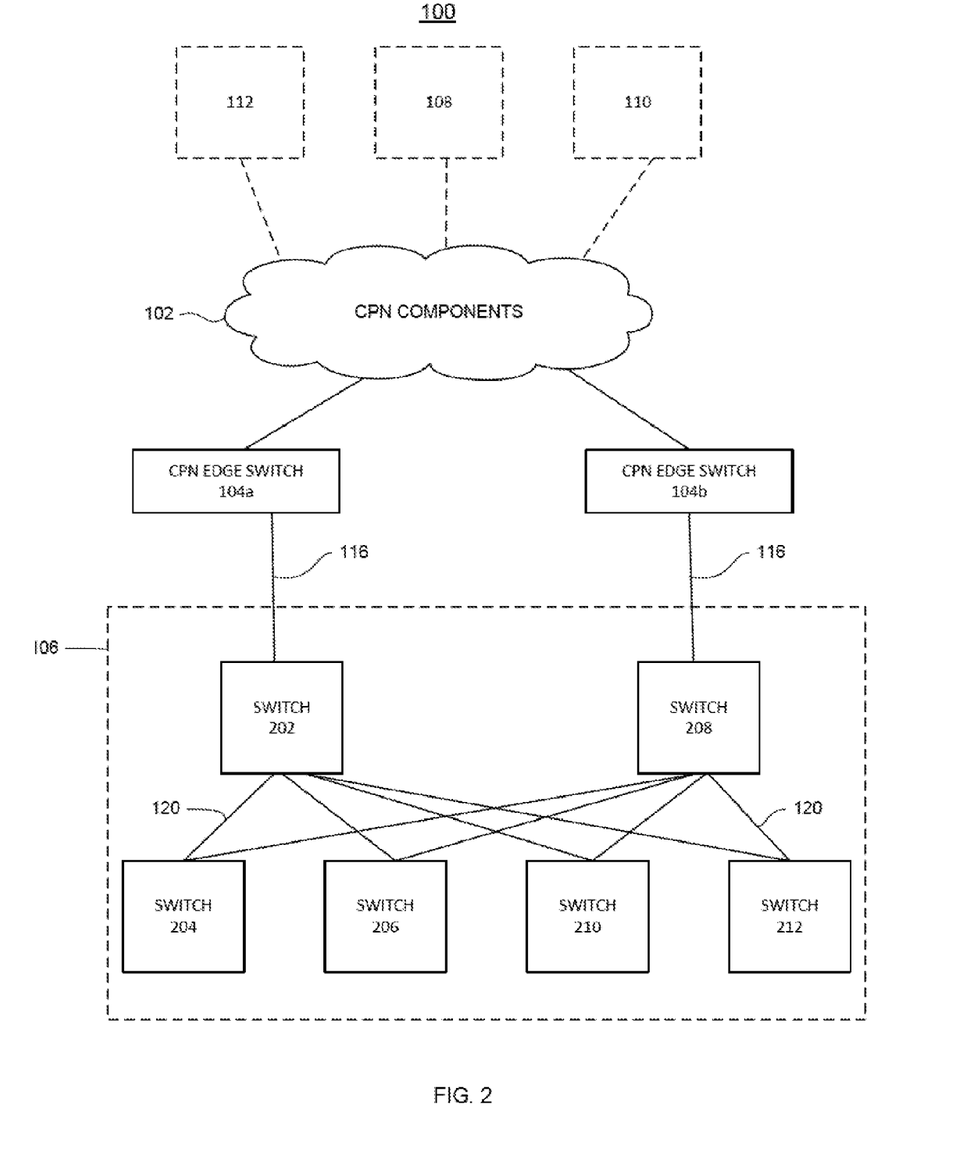
FIG. 2 illustrates an example of configuring first stage switches as a proxy switch for a given number of second stage switches.

In operation, each of the stage 1 switches 114 may be configured by the CPN manager 108 as a layer 2 proxy switch for a subset of the lower stage switches directly or indirectly interconnected to it ("proxied switches"). In general, each proxied switch may be assigned to a single stage 1 proxy switch, regardless of whether the proxied switch is directly or indirectly interconnected with the stage 1 switch. As illustrated in FIG. 2, for example, the CPN manager may configure the stage 1 switch 202 to function as layer 2 proxy switch for stage 2 switches 204, 206. Similarly, the stage 1 switch 208 may be configured to function as layer 2 proxy switch for the stage 2 proxied switches 210, 212. Thus, each of the stage 1 switches configured in this manner may not only respond to an Address Resolution Protocol ("ARP") request from the CPN edge switches for its own Internet Protocol ("IP") address, but also for the IP addresses for the subset of the stage 2 proxied switches for which it functions as a proxy.

By way of a specific example, when the stage 1 proxy switch 202 receives an ARP request from the CPN edge switch 104*a* in accordance with a layer 2 networking protocol, it may respond to the ARP request for not only its own IP address, but also for the IP addresses of the proxied stage 2 switches 204 and 206 (which do not receive the ARP request as they are not directly interconnected to the CPN edge switch 104*a*). Similarly, when the stage 1 proxy switch 208 receives an ARP request from the CPN edge switch 104*b*, it may respond to the ARP request for not only its own IP address, but also for the IP addresses of the proxied stage 2 switches 210 and 212. From the point of view of the CPN edge switch 104*a* which receives the responses to the ARP request(s) in accordance with the layer 2 networking protocol, it appears that each of the switches 202, 204, and 206 is directly interconnected to the CPN switch 104*a*. Similarly, from the point of view of the CPN edge switch 104*b*, it appears that each of the switches 208, 210, and 212 is directly interconnected to the CPN switch 104*b*.

As a result, upon receiving the responses from the proxy switch 202, the CPN edge switch 104*a* may configure the next hop entries in its routing table to appropriately forward all inbound layer 3 CPN management traffic originating from the CPN components 102 and destined for switches 202, 204, or 206 over an inbound link 116 to appropriate input ports of the proxy switch 202. Similarly, the CPN edge switch 104*b* may configure the next hop entries in its routing table to appropriately forward all inbound layer 3 data traffic originating from the CPN components 102 and destined for switches 208, 210, or 212 over an inbound link 116 to the appropriate input ports of the proxy switch 208. In turn, when the proxy switches 202, 208, receive inbound layer 3 data packets from the CPN edge switches at their input ports that are destined for a given one of the respective stage 2 proxied switches, the proxy switches 202, 208, may appropriately further route the data packets to the given proxied destination switch using a layer 3 routing protocol via output ports interconnected using the networking links 120.

Figure 3:
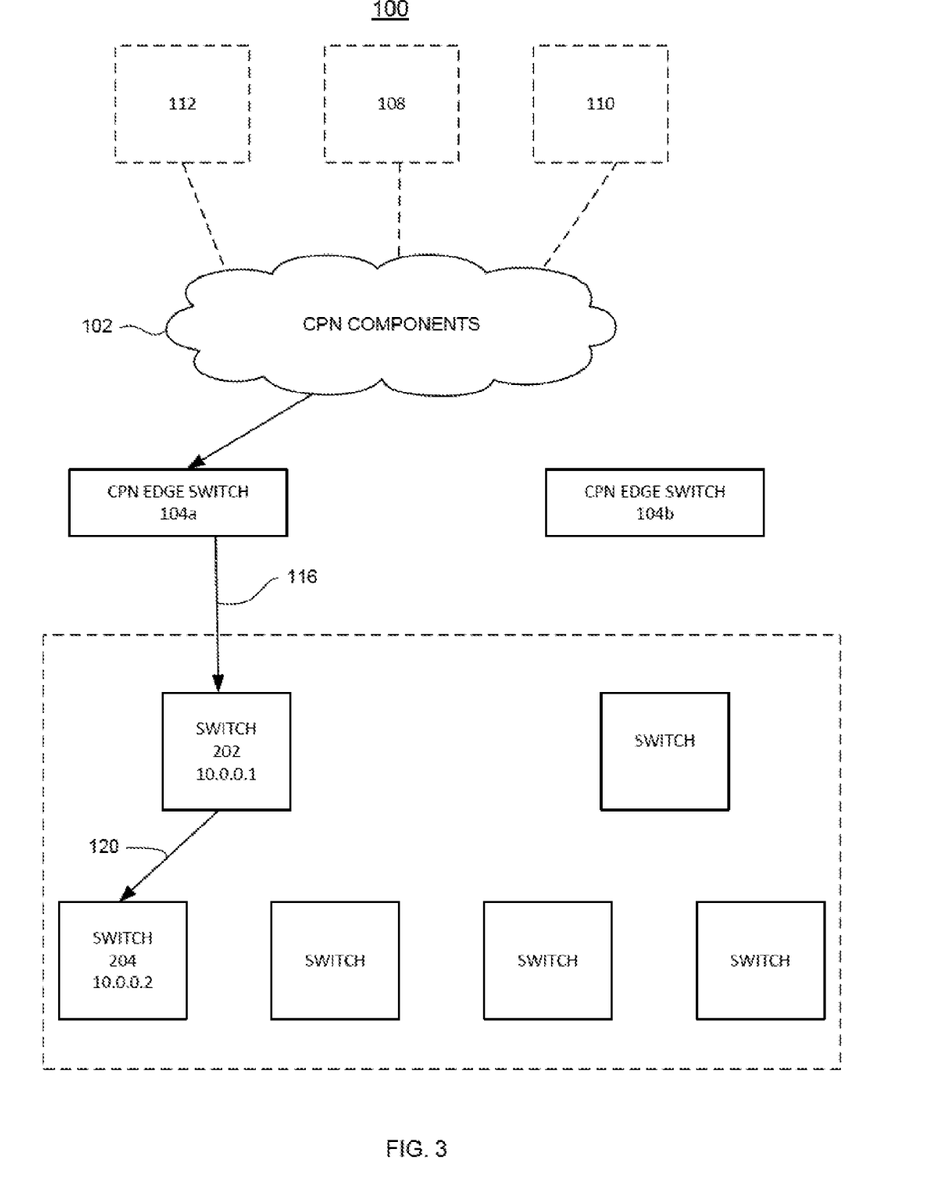
FIG. 3 illustrates an example of routing inbound management data traffic from a given first stage switch to a designated second stage switch.

FIG. 3 illustrates a simplified example of the foregoing. As shown in this figure, the proxy switch 202 having an IP address 10.0.0.1 may be configured as a layer 2 proxy switch for proxied ToR switch 204, having an IP address of 10.0.0.2. As noted above, from the point of view of the CPN edge switch 104a, such configuration creates the appearance that both the proxy switch 202 and the proxied switch 204 are directly interconnected to the CPN edge switch 104a. In a typical system which may include a large number of proxied ToR switches, such a configuration may enable more efficient in-band management of the proxied ToR switches while at the same time reducing the complexity of managing a large number of ToR switches in the data center. Thus, for example, the CPN edge switch 104a may be enabled to configure its routing tables to route, and the proxy switch 202 may receive, all inbound CPN management traffic originating from the CPN components 102 and destined for the proxied switch 204. The proxy switch 202 may then further route, using the layer 3 networking protocol, the inbound traffic via appropriate link 120 to the IP address 10.0.0.2 of the destination proxied switch 204.

While the proxied ToR switches in the switch cluster may receive layer 3 inbound CPN management traffic from a respective proxy switch in a previous stage as described above, outbound data traffic transmitted by a proxied ToR switch (for example, CPN management traffic destined for one or more of the CPN components 102 or other data traffic to devices in the data center), may be selectively routed using a layer 3 networking protocol through all of the switches in the previous stages, regardless of whether the switch through which the outbound data is routed is a proxy switch for the transmitting switch or not.

Figure 4:
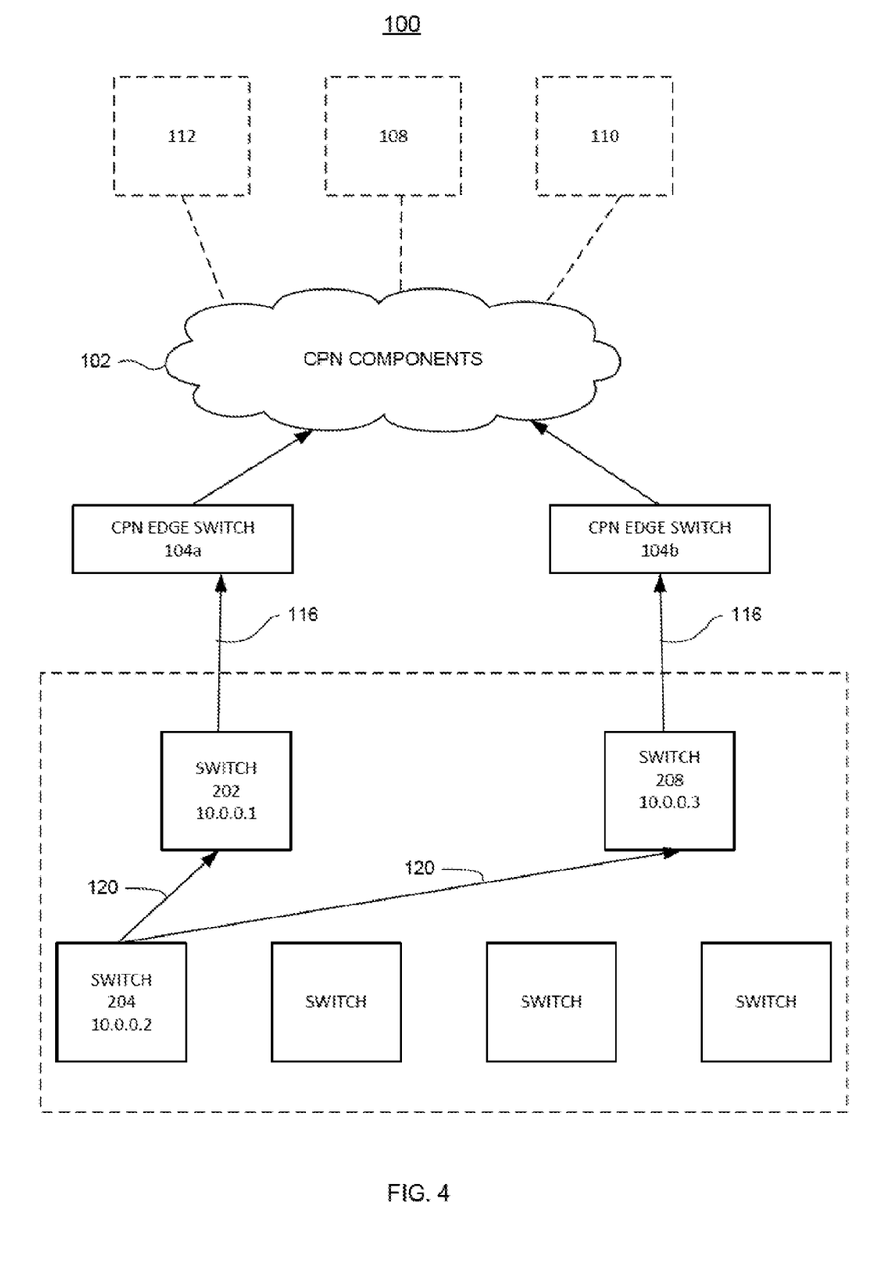
FIG. 4 illustrates an example of load balancing the outbound data traffic originating in the second stage switches.

This is illustrated in FIG. 4, which shows that outbound management traffic originating from the proxied switch 204 and destined for one or more of the CPN components 102 may be routed by the proxied switch 204 through either the proxy switch 202, or through the switch 208, even though switch 208 is not configured as the inbound proxy switch for the proxied switch 204. Regardless of whether the management data traffic (or other data traffic) transmitted by the proxied switch 204 is routed through the proxy switch 202 or the switch 208, the outbound traffic may still reach the CPN components 102 (or other destination devices in the data center) via either the CPN edge switch 104a, or via the CPN edge switch 104b. Thus, the present disclosure not only allows for efficient in-band management of the proxied ToR switches via one or more proxy switches, it also allows for the proxied switches to perform load balancing (e.g., using an ECMP hash) with respect to outbound data traffic originating from the proxied switches on all available uplinks to the CPN components 102. Such functionality of the proxied switches with respect to the outbound traffic may be centrally managed by the CPN manager 108 by statically or dynamically configuring the routing tables of the proxied switches appropriately via one or more inbound CPN management commands, or, in another aspect, may be configured by a CPN management software component executing locally on one or more of the proxied switches.

In one aspect, the CPN manager 108 may periodically transmit a reachability message to each of the stage 2 proxied switches, which may be received via inbound links from a stage 1 proxy switch in the manner described above. As the proxied switches may not have the full knowledge of the topology of the data center (and thus may not be aware of all available uplinks), the CPN manager 108 may use the reachability message to inform each of the proxied switches of all available uplinks for communication with one or more of the CPN components 102. This aspect is discussed below with reference to FIG. 5.

Figure 5:
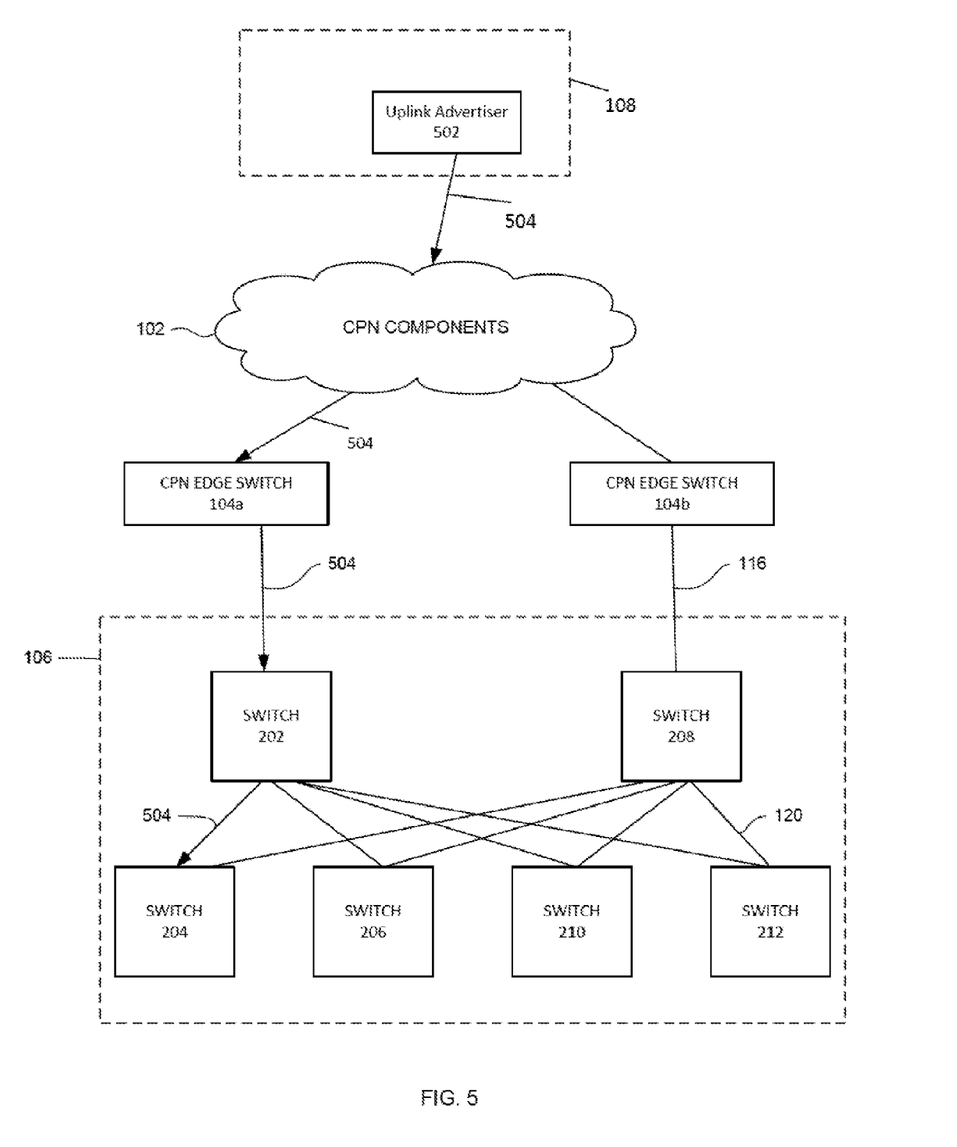
FIG. 5 illustrates an example for centrally configuring the switch cluster to use all available uplinks.

As shown in FIG. 5, the CPN manager 108 may include an uplink advertiser 502 that may periodically transmit a reachability message 504 (indicated using arrows) to the proxied switch 204 via the proxy switch 202. While only a single reachability message is illustrated for simplicity, the uplink advertiser 502 may transmit similar reachability messages to each of the other proxied switches 206, 210 and 212. The reachability message 504 may inform the stage 2 proxied switch 204 that it may reach the CPN components 102 by routing outbound data traffic using an available uplink to either the stage 1 proxy switch 202, or to the stage 1 switch 208. As a result, the stage 2 proxied switch 204 may configure its next hop entries in a routing table and perform load balancing of outbound data traffic on each available uplink from the proxied switch 202 to each available stage 1 switches (e.g., by calculating an ECMP hash for each uplink).

The reachability message may not only inform the proxied switches as to uplinks available to each proxied switch, it also provides a mechanism for handling certain link or switch failures in the data center 100. For example, the CPN manager 108 may detect a failure in stage 1 switch 208 (or in one of its unidirectional uplinks from a stage 2 switch) that may result in not being able to receive outbound traffic from one or more of the stage 2 switches by the CPN components 102. In this case, the CPN manager may transmit, via the uplink advertiser 502, a reachability message 504 to each of the proxied switches 204, 206, 210 and 212, informing each switch of the failure as appropriate. The affected proxied switches may then take appropriate action, (e.g., remove the uplinks to failed switch from the next hop entries its routing table) and avoid transmitting outbound data traffic to the failed switch or unidirectional uplink while continuing to use all other available uplinks for the outbound data traffic. In order to keep the proxied switches updated, the CPN manager may transmit reachability messages periodically to each of the proxied switches. Thus, when a link or switch failure is remedied (or detected) and an uplink or switch becomes available (or unavailable), the affected proxy switches may, in response to the reachability message, be configured to take appropriate action in their respective routing tables and transmit outbound data traffic over the available uplinks.

Certain failures, such as a failure of a stage 1 proxy switch or a failure in unidirectional inbound link from a stage 1 proxy switch to a lower stage proxied switch (or switches) may require a reassignment of the affected proxied switches to other available and functioning stage 1 proxy switches. Before explaining such reassignment however, a general process for assigning proxy switches to proxied switches is now described below with reference to FIG. 6.

Figure 6:
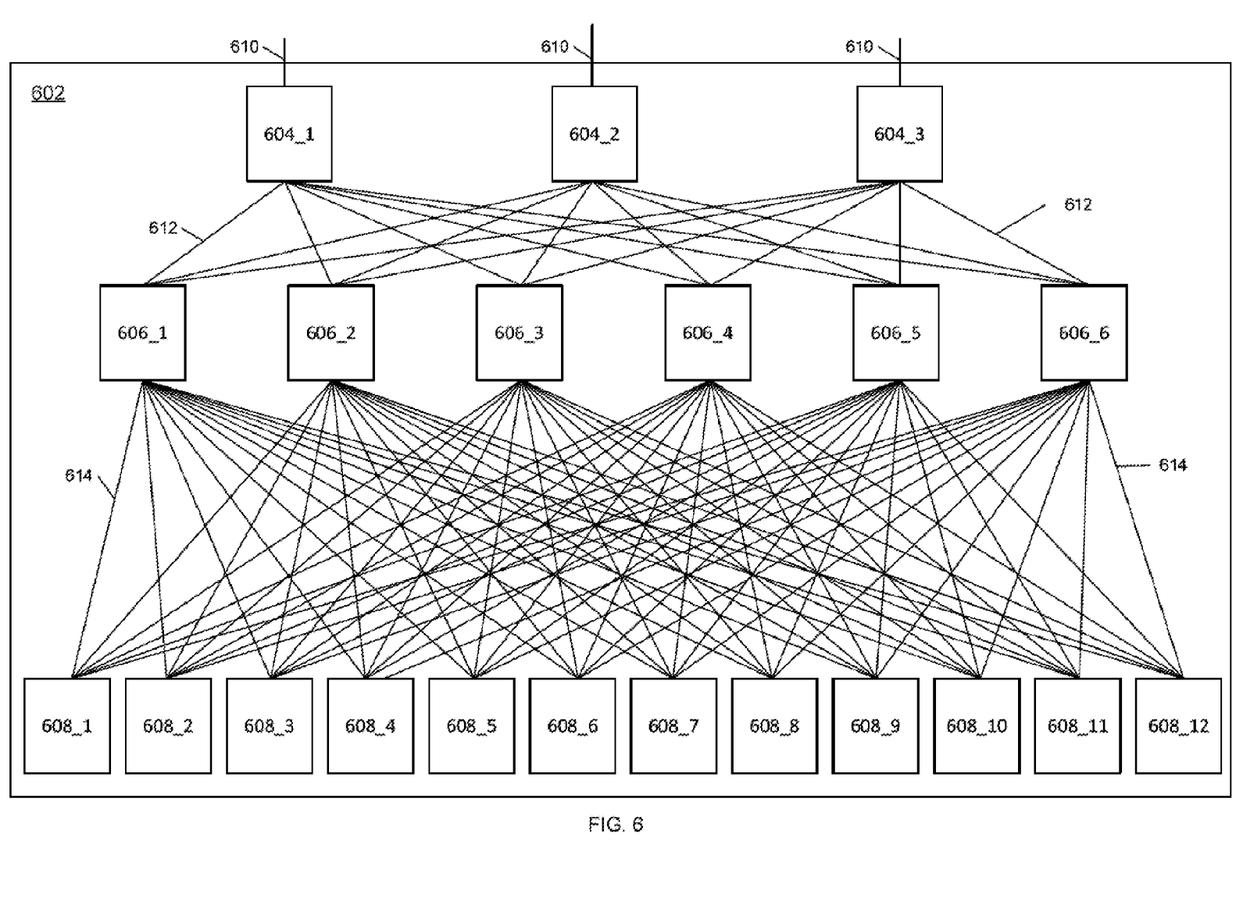
FIG. 6 illustrates an example of in-band management of a three-stage Clos switch cluster.

FIG. 6 illustrates a switch cluster 602 which includes three stages. As shown, the first stage 604 ("stage 1") may include three switches, labeled as 604_1 thorough 604_3. The second stage 606 ("stage 2") may include 6 switches, labeled as 606_1 through 606_6. The third stage 608 ("stage 3") may include 12 switches, labeled as 608_1 through 608_12. As before, the input and output ports of each of the stage 1 switches may be directly interconnected via bidirectional links 610 to one or more respective CPN edge switches (not shown). Furthermore, the input and output ports of each of the stage 2 switches may also be directly interconnected (as before) via bidirectional links 612 to each of the stage 1 switches in a Clos architecture. Lastly, the input and output ports of each of the stage 3 switches may be directly interconnected via bidirectional links 614 to each of the stage 2 switches directly above, also in a Clos or Clos like formation. As a result, the stage 2 switches may be directly interconnected to the stage 1 switches via bidirectional links 612, whereas the stage 3 switches, which are directly interconnected to the stage 2 switches via bidirectional links 614, may be considered to be indirectly interconnected to the stage 1 switches via the stage 2 switches. Together, the stage 1, stage 2, and stage 3 switches may thus constitute a multi-stage Clos architecture switch cluster.

As before, the CPN manager may centrally (or locally) manage the switch cluster 602 and configure or assign each of the stage 1 switches to function as a layer 2 proxy switch for a number of stage 2 and stage 3 proxied switches in the cluster. In one embodiment, the CPN manager may designate each of the stage 1 proxy switches by evenly distributing the number interconnected links for the stage 2 and stage 3 proxied switches between each of the stage 1 switches. Such distribution may be advantageous as it may ensure that each stage 1 switch functions as a proxy switch for approximately the same number of stage 2 and stage 3 proxied switches, thus resulting in a good load balance for each stage 1 proxy switch in the cluster with respect to inbound management traffic originating from the CPN components. In other embodiments, the CPN manager may designate stage 1 proxy switches for stage 2 and stage 2 proxied switches based on not only the number of switches in the cluster, but also (or instead) based on other criteria, such as, for example, the physical location or proximity of the stage 2 and stage 3 proxied switches to the stage 1 proxy switches, or based on an estimated or actual network latency between the switches in the switch cluster.

By way of a specific example, the CPN manager may designate the stage 1 switch 604_1 as a layer 2 proxy switch for the stage 2 proxied switches 606_1, 606_2, and the stage proxied switches 608_1, 608_2, 608_3, and 608_4. Similarly, the CPM manager may designate the stage 1 switch 604_2 as a layer 2 proxy switch for the stage 2 proxied switches 606_3, 606_4, and the stage 3 proxied switches 608_5, 608_6, 608_7, and 608_8. Finally, the CPM manager may designate the stage 1 switch 604_3 as a layer 2 proxy switch for the stage 2 proxied switches 606_5, 606_6, and the stage 3 proxied switches 608_9, 608_10, 608_11, and 608_12. In general, such distribution may be expressed as [S2/3 (k)]/[S1 (n)], where S2/3 (k) may represent a k number of stage 2 or stage 3 proxied switches, and S1 (n) may represent the number of the stage 1 proxy switches. If the number of interconnections between the switches do not allow for a completely even distribution, any remaining stage 2 or stage 3 switches may be arbitrarily assigned to a stage 1 proxy switch, or assigned based on criteria such as proximity and/or network latency.

As before, each stage 1 proxy switch may be configured to not only respond to an ARP request from a CPN edge switch for its own IP address, but also for the IP addresses of all respective proxied switches. Thus, from the point of a CPN edge switch, which is directly interconnected to a particular stage 1 proxy switch, and which receives the response to the ARP request, it may appear that the particular stage 1 proxy switch, and its respective stage 2 and stage 3 proxied switches, are all directly interconnected to the CPN edge switch, thus enabling more efficient in-band management of the proxied switches in the switch cluster, without requiring actual direct interconnections between the proxied switches and the CPN edge switch.

While a stage 2 or stage 3 proxied switch may receive inbound layer 3 management data traffic from one or more CPN components (e.g., CPN manager) via its respectively assigned proxy switch as described previously, each of the proxied switches may use all available uplinks with respect to outbound data traffic originating from the proxied switches. In order to facilitate such functionality, the CPN manager may periodically transmit reachability messages to each of the proxied switches to notify the switches with respect to all available uplinks. Thus, for example, each of the stage 2 proxied switches 606_1 to 606_6 may transmit outbound data traffic using all available uplinks to each of the stage 1 switches 604_1 to 604_3, regardless of whether a particular stage 1 switch is a respective proxy switch for the transmitting proxied switch or not. Similarly, each of the stage 3 proxied switches 608_1 to 608_12 may transmit outbound data traffic using all available uplinks to each of the stage 2 proxied switches 606_1 to 606_6 to which it is interconnected. In this manner, the stage 2 and stage 3 proxied may load balance outbound traffic over all available uplinks in the switch cluster.

Upon detection of a unidirectional link failure, or even a switch failure, in one of the stage 1 proxy switches, the CPN manager may redistribute the affected proxied switches to other functioning stage 1 proxy switches. For example, if the stage 1 proxy switch 604_1 becomes unavailable (or even if it is determined to be overloaded), the CPN manager may distribute some or all of the stage 2 proxied switches 606_1, 606_2, and the stage 3 proxied switches 608_1, 608_2, 608_3, and 608_4 to either or both of the other stage 1 proxy switches 604_2 or 604_3. If the failure only affects the inbound links to the proxied switches, then the CPN manager may simply redistribute the affected proxied switches as described above and allow the proxied switches to continue to route outbound data traffic over all available uplinks, including the uplinks to the stage 1 604_1 switch. However, if the uplinks are also affected, as may happen if there is a complete switch failure of switch 604_1, the CPN manager may send a reachability message to each of the proxied switches (via one of the other stage 1 proxy switches) to notify the proxied switches of such failure. In this case, the proxied switches may then route outbound data traffic using available uplinks of the stage 1 switches 604_2 and 604_3 only, and remove the uplinks to the defective stage 1 switch 604_1 from their routing table. In certain situations, the proxied switches may also be able to detect uplink failures without having to receive a reachability message (e.g., if a response is not received within a predetermined period of time or after several data transmissions over a given uplink). In this case, the affected proxied switches may remove the suspected defective uplinks from the routing table, and may continue to route data traffic over the remaining available uplinks.

Figure 7:
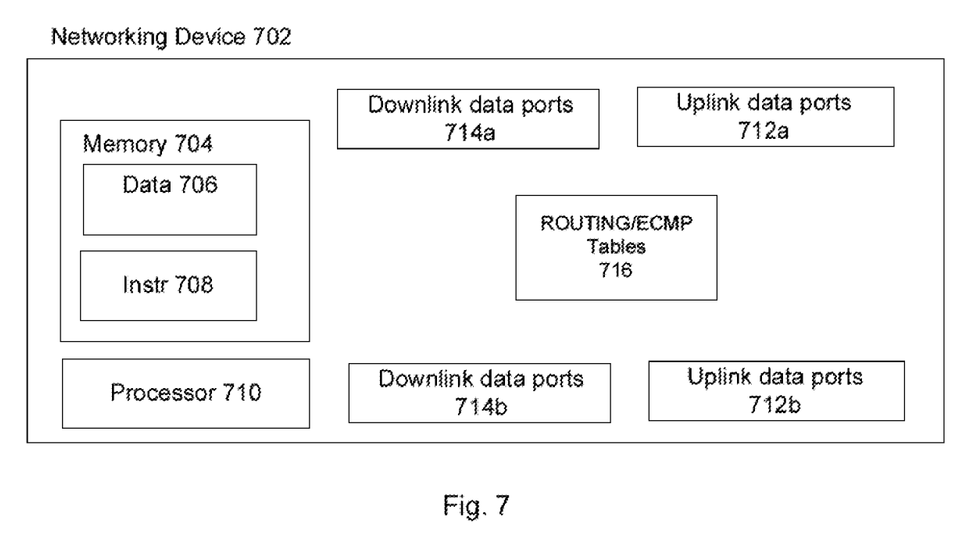
FIG. 7 illustrates an example configuration of a networking device in the data center.

The various devices of the datacenter discussed above, such as the CPN components, CPN edge switches, the multistage switches, and other devices such as the host devices may be implemented as servers, routers, chips, or any type of networking device capable of receiving data traffic (e.g., data packets) at a first port and processing and transmitting the data traffic through a second port in accordance with one or more networking protocols. FIG. 7 illustrates an example of a networking device, such as networking device 702. The networking device 702 may comprise a memory 704, including data 706 and instructions 708, and a processor 710 coupled to the memory 704. The networking device may further comprise a number of data ports, such as uplink data ports 712a and 712b, and downlink data ports 714a and 714b for interconnecting the networking device to the appropriate data ports of other networking devices in the data center. Together, a set of appropriately wired uplink and downlink data ports may constitute one or more bidirectional links for enabling bidirectional communications between the networking device and another device in the data center.

The networking device 702 may also include one or more routing or forwarding table(s) 716. For example, the routing tables 716 may include a number of entries, each listing a key and being associated with a particular data port. As data traffic is received by the networking device 702 via a downlink port, header information in accordance with a layer 2 or layer 3 networking protocol may be matched against the keys of the routing table(s) to determine a corresponding uplink port (e.g., a ECMP next hop) over which the data traffic may then be forwarded or routed to a downlink port of another networking device in the data center. While the tables 716 are shown as being stored separately from the memory 704, it should be understood that the routing table(s) 716, data 706, and instructions 708 may all be stored in the same medium.

The memory 704 stores information accessible by processor 710, including instructions 708, and data 706 that may be executed or otherwise processed by the processor 710. The memory 704 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 708 may be any set of instructions (e.g., software application or modules) to be executed directly (such as machine code) or indirectly (such as scripts) by the processor 704 in accordance with various embodiments discussed above. For example, the instructions may be stored as computer code on the computer-readable medium. In that regard, the terms "instructions", "process" and "programs" are considered to be interchangeable herein. The instructions may be stored in object code format for direct processing by the processor, or in any other computer language including scripts or collections of independent source code modules that are interpreted on demand or compiled in advance. In one aspect, the functionality discussed above with respect to the CPN management components, the CPN edge switches, and one or more of the switches in the multi-stage switch cluster may be implemented using appropriate instructions, organized as functions, methods and routines, which are executed by the processor in accordance with various embodiments of the present disclosure.

The data 706 (including the routing table(s) 716) may be retrieved, stored or modified by processor 710 in accordance with the instructions 708. For instance, although the system and method is not limited by any particular data structure, the data may be stored in computer registers, in a relational database as a table having a plurality of different fields and records, XML documents or flat files. The data may also be formatted in any computer-readable format. The data may comprise any information sufficient to identify the relevant information, such as numbers, descriptive text, proprietary codes, references to data stored in other areas of the same memory or different memories (including other network locations) or information that is used by a function to calculate the relevant data.

The processor 710 may be any conventional processor, such as processors in commercially available switches, routers, servers, or general purpose computing devices. Alternatively, the processor may be a dedicated controller such as an ASIC or other hardware-based processor. The processor and memory may actually comprise multiple processors and memories that may or may not be stored within the same physical housing. For example, memory may be a hard drive or other storage media located in a server farm of the data center. Accordingly, references to a processor, memory, or computer will be understood to include references to a collection of processors, memories or computers that may or may not operate in parallel.

Thus, each of the components of the data center, such as the CPN components, the CPN edge switch, and the multi-stage switch cluster discussed above, may be implemented using a combination of hardware and software in the form of the networking device discussed above. While the same networking device may be used for the various devices of the data center (such as the multi-stage cluster switches), a networking device may be configured differently (e.g., in software or hardware) based on its particular role in the data center. For example, the networking devices in the data center may be configured differently (e.g., by being programmed differently) depending on whether a networking device is implemented as a CPN management component, a CPN edge switch, or one of the stage 1 or lower stage cluster switches as discussed in detail above.

Figure 8:
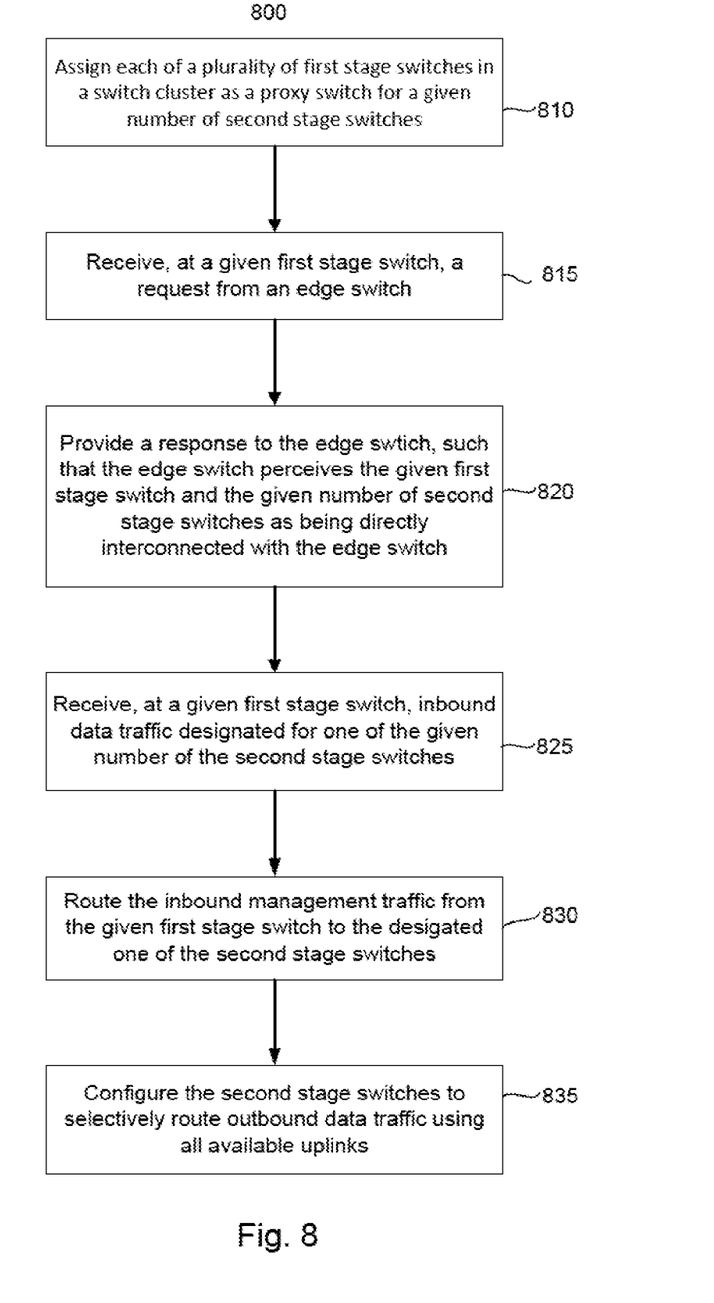
FIG. 8 illustrates a process flow diagram in accordance with various aspects of the disclosure.

FIG. 8 illustrates a process flow 800 diagram for in-band CPN management of a switch cluster in a data center in accordance with various aspects of the disclosure. While the description below refers to a number of blocks of the process flow 800 in a particular order, it should be understood that the order in which the blocks are performed may be modified, and certain blocks may be added or omitted.

In block 810, the process may include assigning each of a plurality of first stage switches in the switch cluster as a proxy switch for a given number of second stage switches in the switch cluster. In one aspect, for example, respective input and output ports of each of the first stage switches and the second stage switches may be directly interconnected to each other in a Clos type architecture via a first set of bidirectional networking links. The bidirectional networking links may be, for example, ECMP links that provide an equal number of networking links interconnecting each of the first stage switches to each of the second stage switches.

It will be understood that the number of stages of the cluster switches is not limited. For example, in other embodiments the switch cluster may include additional stages of one or more switches. In this case, each of the first stage switches may be additionally assigned as a proxy switch for a given number of switches in each of the additional stages. Furthermore, each of the switches in the additional stages may be interconnected to each of the switches in the previous stage via one or more bidirectional links.

In block 815, the process may include receiving, at a given first stage switch, a request from one or more edge switches, where the one or more edge switches may be directly interconnected to the one or more of the first stage switches (and not to the second stage switches) via a second set of bidirectional networking links. For example, the given first stage switch may receive an ARP request via the second set of bidirectional networking links from an edge switch to which it is directly interconnected in accordance with a layer 2 networking protocol.

In block 820, the process may include providing a response back to the edge switch from which the request is received, such that the response creates an appearance at the edge switch that the given first stage switch, and each of the second stage switches proxied by the first stage switch, are directly interconnected to the edge switch. For example, the given first stage switch may respond (in accordance with the layer 2 networking protocol) to the ARP request for not only its own IP address, but also for the IP addresses of each of the given number of second stage switches for which it serves as a proxy switch. In this manner, the edge switch may perceive the given first stage switch and the respective proxied second stage switches as all being directly interconnected to it via the second set of bidirectional networking links, even though the proxied second stage switches are not in fact directly interconnected to the edge switch.

In block 825, the process may include receiving, at the given first stage switch, inbound data traffic designated for one of the proxied second stage switches. For example, the inbound data traffic may be CPN management traffic originating from a CPN management component for configuring the operation of the designated proxied second stage switch. In one aspect, the CPN management traffic may be transmitted and received in accordance with a layer 3 networking protocol, and the CPN management component may be, for example, a CPN controller that is interconnected (directly or indirectly) to one or more of the CPN edge switches. The CPN edge switch may forward the CPN management traffic to the given first stage switch via one or more of the second set of bidirectional links based the prior response provide by the given first stage switch to its ARP request.

In block 830, the process may include routing inbound data traffic from the given first stage switch to the designated one of the proxied second stage switches for further processing by the designated destination switch. In one aspect, for example, the given first stage switch may route the inbound data traffic to the designated one of the second stage switches via the first set of bidirectional links using a layer 3 networking protocol. Upon reception of the inbound data traffic, the designated second stage proxy switch may configure its operation in accordance with the content of the message received from the CPN component.

In block 835, the process may further include configuring the second stage switches to use all available uplinks in the first set of bidirectional networking links with respect to outbound data traffic originating from the second stage switches. For example the routing table entries in each of the second stage switches may be appropriately configured with next hop entries such that each of the second stage switches uses all available uplinks for transmitting data traffic from the second stage switches to each of the first stage switches. In one aspect, the second stage switches may be additionally configured to load balance outbound data traffic over all available uplinks. Such configuration may be managed centrally from, for example, a CPN controller, which may transmit inbound messages, such as the reachability message discussed previously for configuring the second stage switches, which may be received and acted upon appropriately. Thus, each of the second stage switches may route outbound data traffic to each of the first stage switches over all available uplinks in the first set of bidirectional networking links, even though a given first stage switch to which outbound data is routed from a given second stage switch may not be assigned as a proxy switch for the given second stage switch.

The various embodiments described above are believed to incur a number of advantages. To begin with, the present disclosure facilitates in-band management of a large number of ToR switches in a switch cluster which, from the point of view of a CPN edge switch, appear to be directly interconnected to the CPN edge switch due to the configuration of the stage 1 switches as layer 2 proxy switches for a number of lower stage proxied switches in the switch cluster, without requiring additional direct interconnections between the lower stage switches and the CPN edge switch. Furthermore, the proxy switches may be dynamically load balanced by distributing bidirectional links of the proxied switches across a number of proxy switches, such that each first stage switch functions as a proxy switch for an approximately same number of lower stage proxied switches. Yet further, the outbound data traffic originating from the proxied switches may also be dynamically load balanced, as the proxied switches may use all available uplinks in the switch cluster to route outbound data traffic to either the CPN components, or to other devices in the data center. Further still, a number of failures in the switch fabric, such as failure of a particular switch, failure of a unidirectional inbound link, and/or failure of a unidirectional outbound link may be handled dynamically and seamlessly without requiring extensive reconfigurations of the switch cluster.

Therefore, the systems and methods disclosed herein are believed to more advantageous than other configurations of a switch cluster, such as one in which the cluster switches are configured into separate Virtual Local Area Networks ("VLANs") that are interconnected to the CPN edge switches. Such VLAN configurations may suffer from a number of disadvantages. For example, VLAN configurations typically do not allow switches in one VLAN to use all available uplinks in the switch cluster, because switches in a particular VLAN may be restricted to uplinks in their own VLAN. This results in suboptimal load balancing, as any particular switch in the cluster may not be able to transmit outbound data traffic over all possible uplinks in the cluster. Furthermore, failures in the switch fabric, such as a switch failure, may be harder to correct and may require an extensive reconfiguration of one or all VLANs. Finally, the VLAN configurations are generally harder to load balance, and thus certain failures in the switch fabric may result in even poorer load balancing of the inbound or outbound data traffic within one or more affected VLANs, which, in turn, may require a complete or partial reconfiguration of all VLANs.

Although the present disclosure has been illustrated with reference to particular embodiments, it should be understood that these examples are merely illustrative of the principles and applications of the disclosure. For example, it should be understood that the described system and method may be implemented over any network, such as the Internet, or any private network connected through a router. For example, the network may be a virtual private network operating over the Internet, a local area network, or a wide area network. Additionally, it should be understood that numerous other modifications may be made to the illustrative embodiments. However, these and that other arrangements may be devised without departing from the spirit and scope of the present disclosure as defined by the appended claims.

The invention claimed is:

1. A method for in-band management of a plurality of switches in a data center, the method comprising:
   assigning a given first stage switch in a switch cluster as a proxy switch for downlink traffic for a first set of second stage switches in the switch cluster;
   assigning another first stage switch in the switch cluster as a proxy switch for downlink traffic for a second set of second stage switches in the switch cluster, the second set being different than the first set, wherein each of the first set of second stage switches and the second set of second stage switches are directly interconnected to both the given first stage switch and the another first stage switch via a first set of bidirectional networking links;
   receiving, at the given first stage switch, an address resolution request from a control plane network (CPN) edge switch directly interconnected with the given first stage switch via a second set of bidirectional networking links, the CPN edge switch providing connectivity to one or more CPN components managing the plurality of switches;

providing, by the given first stage switch, a response to the address resolution request received from the CPN edge switch, the response including an Internet Protocol (IP) address of the given first stage switch and respective IP addresses of switches of the first set of second stage switches;

in response to receiving the response at the CPN edge switch, configuring a routing table of the CPN edge switch to send traffic destined for the first set of second stage switches to the given first stage switch;

receiving, at a given second stage switch in the first set of second stage switches, downlink traffic through the given first stage switch assigned as the proxy for the given second stage switch; and configuring the given second stage switch in the first set of second stage switches, based on the received traffic, to send a first portion of uplink traffic to the given first stage switch assigned as the proxy, and to send a second portion of the uplink traffic to the another first stage switch that is not assigned as a proxy to the given second stage switch, the second portion being different than the first portion;

wherein the set of second stage switches do not receive any address resolution requests.

2. The method of claim 1, further comprising:

receiving, at the given first stage switch, a control plane management message from a control plane management component, the control plane management message being designated for one of the first set of second stage switches; and, routing the control plane management message from the given first stage switch to the designated one of the first set of second stage switches.

3. The method claim 1, further comprising:

configuring the first set of second stage switches and the second set of second stage switches to selectively route outbound data traffic originating from the second stage switches using all available uplinks in the first set of bidirectional networking links.

4. The method of claim 3, further comprising:

configuring the first set of second stage switches and the second set of second stage switches to load balance the outbound data traffic originating from the second stage switches across all available uplinks in the first set of bidirectional links.

5. The method of claim 3, wherein the outbound data traffic originating from the first set of second stage switches is selectively routed using all available uplinks in accordance with a layer 3 networking protocol.

6. The method of claim 3, further comprising:

periodically transmitting a reachability message to each of the first set of second stage switches and the second set of second stage switches, the reachability message updating the second stage switches with all available uplinks in the first set of bidirectional links.

7. The method of claim 1, wherein the given first stage switch is configured as the proxy switch for the first set of the second stage switches in accordance with a layer 2 networking protocol.

8. The method of claim 1, wherein the address resolution request and the response are in accordance with a layer 2 networking protocol.

9. The method of claim 1, further comprising:

detecting a failure in the given first stage switch; and, reassigning the another first stage switch as the proxy switch for the first set of second stage switches.

10. A system for in-band management of a data center having a switch cluster including a plurality of switches, the system comprising:

a control plane network (CPN) management component;

one or more CPN edge switches connected to the CPN management component, each of the one or more CPN edge switches including a routing table;

a given first stage switch in the switch cluster connected to one of the CPN edge switches via a second set of bidirectional links;

another first stage switch in the switch cluster connected to one of the CPN edge switches;

a first set of second stage switches in the switch cluster;

a second set of second stage switches in the switch cluster, the second set being different from the first set;

wherein the given first stage switch is assigned as a proxy switch for downlink traffic for the first set of second stage switches, and the another first stage switch is assigned as a proxy for downlink traffic for the second set of second stage switches, and each of the first set of second stage switches and the second set of second stage switches are directly interconnected to both the given first stage switch and the another first stage switch via a first set of bi-directional networking links;

wherein the given first stage switch, when assigned as the proxy switch, responds to address resolution requests from the CPN edge switch with its own Internet Protocol (IP) address and with respective IP addresses of switches of the first set of second stage switches;

wherein the first set of second stage switches do not receive any address resolution requests; and wherein the CPN management component is configured to:

update the routing table of the CPN edge switch to send traffic destined for the first set of second stage switches to the given first stage switch; and configure a given second stage switch to send a first portion of uplink traffic to the given first stage switch assigned as the proxy, and to send a second portion of the uplink traffic to the another first stage switch that is not assigned as a proxy to the given second stage switch, the second portion being different than the first portion.

11. The system of claim 10, wherein the given first stage switch is further configured to:

receive a control plane management message from the control plane management component via the second set of bidirectional networking links, the control plane management message being designated for one of the first set of second stage switches proxied by the given first stage switch; and, route the control plane management message from the given first stage switch to the designated one of the first set of second stage switches via the first set of bidirectional links.

12. The system of claim 10, wherein each of the second stage switches are further configured to selectively route outbound data traffic originating from each of the second stage switches using all available uplinks in the first set of bidirectional networking links.

13. The system of claim 12, wherein each of the second stage switches are further configured to load balance the outbound data traffic originating from each of the second stage switches across all available uplinks in the first set of bidirectional links.

14. The system of claim 12, wherein each of the second stage switches are further configured to route the outbound data traffic originating from each of the second stage switches using all available uplinks in accordance with a layer 3 networking protocol.

15. The system of claim 12, wherein the second stage switches are further configured to periodically receive a reachability message for updating each of the second stage switches with all available uplinks in the first set of bidirectional links.

16. The system of claim 10, wherein the given first stage switch is configured as the proxy switch for the first set of the second stage switches in accordance with a layer 2 networking protocol.

17. The system of claim 10, wherein the response transmitted by the given first stage switch to the CPN edge switch is transmitted in accordance with a layer 2 networking protocol.

18. The system of claim 10, wherein, upon a failure in the given first stage switch, the another first stage switch is reassigned as the proxy switch for the first set of second stage switches.

\* \* \* \* \*